US012060991B1

(12) United States Patent
Murthy et al.

(10) Patent No.: US 12,060,991 B1
(45) Date of Patent: Aug. 13, 2024

(54) LIGHT PIPE WITH UNIFORM AND SEGMENTED LIGHT OUTPUTS FOR BARCODE-READING DEVICES

(71) Applicant: Brady Worldwide, Inc., Milwaukee, WI (US)

(72) Inventors: Manjunatha Prasad Rajashekara Murthy, South Jordan, UT (US); Gregory James Rudd, Milwaukee, WI (US); Ali Pouya Fard, Salt Lake City, UT (US); Jesse Peter Anderegg, Layton, UT (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

(21) Appl. No.: 18/512,467

(22) Filed: Nov. 17, 2023

(51) Int. Cl.
*F21V 7/06* (2006.01)
*G06K 7/10* (2006.01)
*G06K 7/14* (2006.01)

(52) U.S. Cl.
CPC .............. *F21V 7/06* (2013.01); *G06K 7/1413* (2013.01); *G06K 2007/10485* (2013.01)

(58) Field of Classification Search
CPC .... F21V 7/06–09; G06K 7/1404–1434; G06K 2007/10485
See application file for complete search history.

(56) References Cited

U.S. PATENT DOCUMENTS

| 9,329,332 | B2 | 5/2016 | Gerst, III et al. |
| 9,405,951 | B2 | 8/2016 | Nunnink et al. |
| 11,644,158 | B2 | 5/2023 | George et al. |
| 2011/0000966 | A1 | 1/2011 | Liu |

FOREIGN PATENT DOCUMENTS

WO 01/65469 A1 9/2001

*Primary Examiner* — Jason M Han
(74) *Attorney, Agent, or Firm* — Thomas M. Hardman (57) ABSTRACT

A light pipe for an electronic device, such as a barcode-reading device, can include a plurality of light-redirecting surfaces that are each positioned to receive light from a light source within the interior portion of the barcode-reading device and to redirect the light toward an optical element positioned on an exterior surface of the barcode-reading device. The plurality of light sources and the plurality of light-redirecting surfaces can collectively produce a uniform light output at the optical element when all of the plurality of light sources are activated. The light pipe can also include a plurality of optical barriers interspersed between the plurality of light-redirecting surfaces to isolate light from individual light sources. This allows for a segmented light output to be projected onto the optical element. The light pipe can be made from a flexible and resilient material, thereby allowing the light pipe to provide shock absorption.

20 Claims, 6 Drawing Sheets

LIGHT PIPE WITH UNIFORM AND SEGMENTED LIGHT OUTPUTS FOR BARCODE-READING DEVICES

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode.

Light pipes are important components in many electronic devices, including barcode-reading devices. Their primary function is to channel and guide light from one point to another, ensuring efficient light transmission with minimal loss.

Light pipes can be used to channel the light from one or more light-emitting diodes (LEDs) within an interior portion of a barcode-reading device to an exterior surface of the device, thereby providing clear visual feedback to the user. For example, a barcode-reading device can be configured so that one or more embedded LEDs are activated when a barcode is successfully scanned and decoded. A light pipe can be used to channel this light so that it is clearly visible on the exterior surface of the barcode-reading device, indicating to the user that a successful scan has occurred.

As another example, a barcode-reading device may incorporate a plurality of LEDs that collectively indicate the current charge level of a rechargeable battery within the barcode-reading device. The device can be configured so that as the battery's charge level increases, a greater number of these LEDs are illuminated. Using one or more light pipes, the light from these LEDs can be channeled to distinct segments on an exterior surface of the barcode-reading device. This enables a user of the barcode-reading device to easily ascertain the battery's charge level at a glance, making it less likely that the user will be caught off-guard during important scanning operations.

The two uses of light pipes that have just been described utilize different types of light output. Signaling that a barcode is successfully scanned and decoded can be accomplished via a uniform light output. However, signaling the charge level of a battery requires a segmented light output. These two types of light output, uniform and segmented, are inherently in opposition to one another. Achieving a uniform light output requires a substantially homogenous distribution of light. Conversely, a segmented output involves distinct breaks or variations in the light transmission to clearly demarcate one segment from another. In conventional barcode-reading devices, different light pipes and/or different light sources are utilized to achieve both uniform and segmented light outputs.

Barcode-reading devices are used in various industries like retail, logistics, and healthcare. In environments where these devices are used, they may be subject to accidental drops or bumps. It can be important for barcode-reading devices to have components that provide shock absorption and energy dissipation capabilities to mitigate the impact of such physical shocks. In traditional barcode-reading devices, components specifically engineered for shock absorption or heat dissipation, such as rubberized casings or heat sinks, are employed separately from light pipes.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to a light pipe for integration within an interior portion of an electronic device, such as a barcode-reading device. In some embodiments, the light pipe can provide both a uniform light output and a clearly segmented light output. As mentioned previously, these two types of light output (uniform and segmented) are inherently in opposition to each other. However, a light pipe in accordance with some embodiments of the present disclosure can provide both types of light output via a single structure that is manufactured through a single tooling process.

In some embodiments, a light pipe as disclosed herein can be designed for integration within a barcode-reading device that includes a plurality of light sources. The light pipe can include a plurality of light-redirecting surfaces that are each positioned to receive light from a respective light source within the interior portion of the barcode-reading device and to redirect the light toward an optical element positioned on an exterior surface of the barcode-reading device. The plurality of light sources and the plurality of light-redirecting surfaces can collectively produce a uniform light output at the optical element when all of the plurality of light sources are activated. The light pipe can also include a plurality of optical barriers interspersed between the plurality of light-redirecting surfaces to isolate light from individual light sources. This allows for a segmented light output (which is distinct from the uniform light output) to be projected onto the optical element.

The uniform light output and the segmented light output can be utilized to convey different types of information to a user of the barcode-reading device. In some embodiments, the uniform light output can be used to convey information that is inherently binary (has only two possible values), such as whether or not the barcode-reading device has successfully scanned and decoded a barcode. On the other hand, the segmented light output can be utilized to convey information that has more than two possible values, such as the current charge level of a rechargeable battery within the barcode-reading device.

In some embodiments, a light pipe in accordance with the present disclosure can be made from a flexible and resilient material, thereby allowing the light pipe to provide shock absorption. Thus, a light pipe in accordance with the present disclosure can be multifunctional, performing shock absorption in addition to redirecting light from one place to another.

In some embodiments, in addition to being made from a flexible and resilient material, a light pipe can also include a plurality of hollowed zones situated between a first wall and a second wall of the light pipe. In response to an external impact to the barcode-reading device, the hollowed zones can allow the adjacent material to flex (due to the flexible nature of the adjacent material) in order to dissipate energy from the external impact and thereby enhance the shock absorbing capability of the light pipe.

In some embodiments, the light pipe includes a plurality of reinforcing ribs that structurally connect the first wall to the second wall. In such embodiments, the plurality of hollowed zones can be interspersed between the plurality of reinforcing ribs.

In some embodiments, the barcode-reading device includes a printed circuit board assembly (PCBA) that includes one or more light sources and one or more electronic components. The light pipe can be positioned such that the light source(s) on the PCBA are each located underneath a light-redirecting surface of the light pipe. The shock absorbing capabilities of the light pipe can provide some level of protection for the electronic components on the PCBA.

In some embodiments, the light pipe can include a first mounting structure coupled to the first wall and the second wall at a first end of the light pipe. The light pipe can also include a second mounting structure coupled to the first wall and the second wall at a second end of the light pipe. The first mounting structure and the second mounting structure can each include a receiving bore designed to receive a boss that protrudes from the housing of the barcode-reading device. The first mounting structure and the second mounting structure can each additionally include a plurality of engagement tabs that are radially disposed around the receiving bore and that apply radial pressure against the boss when inserted.

This Summary is provided to introduce a selection of certain concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
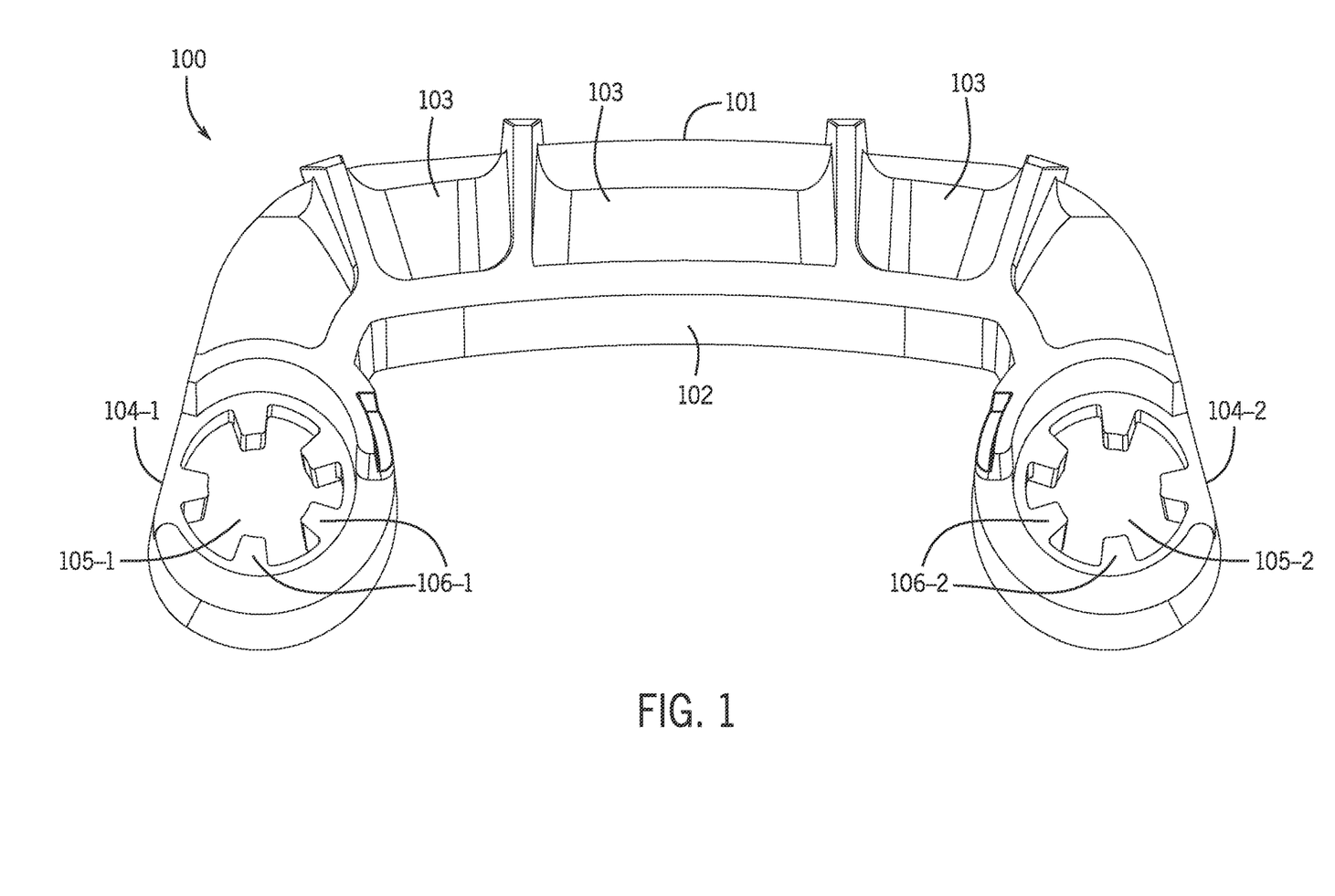
FIG. 1 is a bottom view of a light pipe in accordance with an embodiment of the present disclosure.

FIG. 1 is a bottom view of a light pipe 100 in accordance with an embodiment of the present disclosure. The light pipe 100 is designed for integration within an interior portion of a barcode-reading device (such as the barcode-reading device 110 shown in FIG. 3). As will be described in greater detail below, the light pipe 100 is designed so that it can provide both a uniform light output and a clearly segmented light output. Thus, when the light pipe 100 is integrated into a barcode-reading device, the same set of light sources within the barcode-reading device can be used for different purposes. For example, the same set of light sources can be used both (i) to provide a uniform light output to convey information that is inherently binary, such as whether or not the barcode-reading device has successfully scanned and decoded a barcode, and (ii) to provide a segmented light output to convey information that has more than two possible values, such as the current charge level of a rechargeable battery within the barcode-reading device.

The specific examples of uniform and segmented light outputs just described are provided for purposes of example only and should not be interpreted as limiting the scope of the present disclosure. Some additional non-limiting examples of scenarios in which these different types of light output could be useful will be described below.

As used herein, the term "uniform light output" refers to light output that is characterized by a homogenized light pattern without discernible gaps or variances in brightness. The term "segmented light output" refers to separated and distinct light patterns, each light pattern corresponding to an individual light source within the barcode-reading device.

In some embodiments, the light pipe 100 can be made from a material that is both flexible and resilient, thereby enabling the light pipe 100 to perform a certain amount of shock absorption (including energy dissipation). The shock absorption capabilities of the light pipe 100 will be described in greater detail below.

The light pipe 100 includes a first wall 101 and a second wall 102 opposite the first wall 101. The first wall 101 is structurally connected to the second wall 102. The light pipe 100 also includes a plurality of light-redirecting surfaces 103. The light-redirecting surfaces 103 are designed to redirect light emitted from light sources embedded within an interior portion of a barcode-reading device, as will be described in greater detail below.

The light pipe 100 also includes a first mounting structure 104-1 and a second mounting structure 104-2. The first mounting structure 104-1 is coupled to the first wall 101 and the second wall 102 at one end of the light pipe 100, and the second mounting structure 104-2 is coupled to the first wall 101 and the second wall 102 at the other end of the light pipe 100.

The first mounting structure 104-1 includes a first receiving bore 105-1. A first plurality of engagement tabs 106-1 are radially disposed around the first receiving bore 105-1. Similarly, the second mounting structure 104-2 includes a second receiving bore 105-2. A second plurality of engagement tabs 106-2 are radially disposed around the second receiving bore 105-2. As will be described in greater detail below, the first receiving bore 105-1 and the second receiving bore 105-2 are each designed to receive a boss that protrudes from an interior portion of a housing of a barcode-reading device. The engagement tabs 106-1, 106-2 apply radial pressure against the bosses in order to secure the light pipe 100 to the barcode-reading device.

Figure 2:
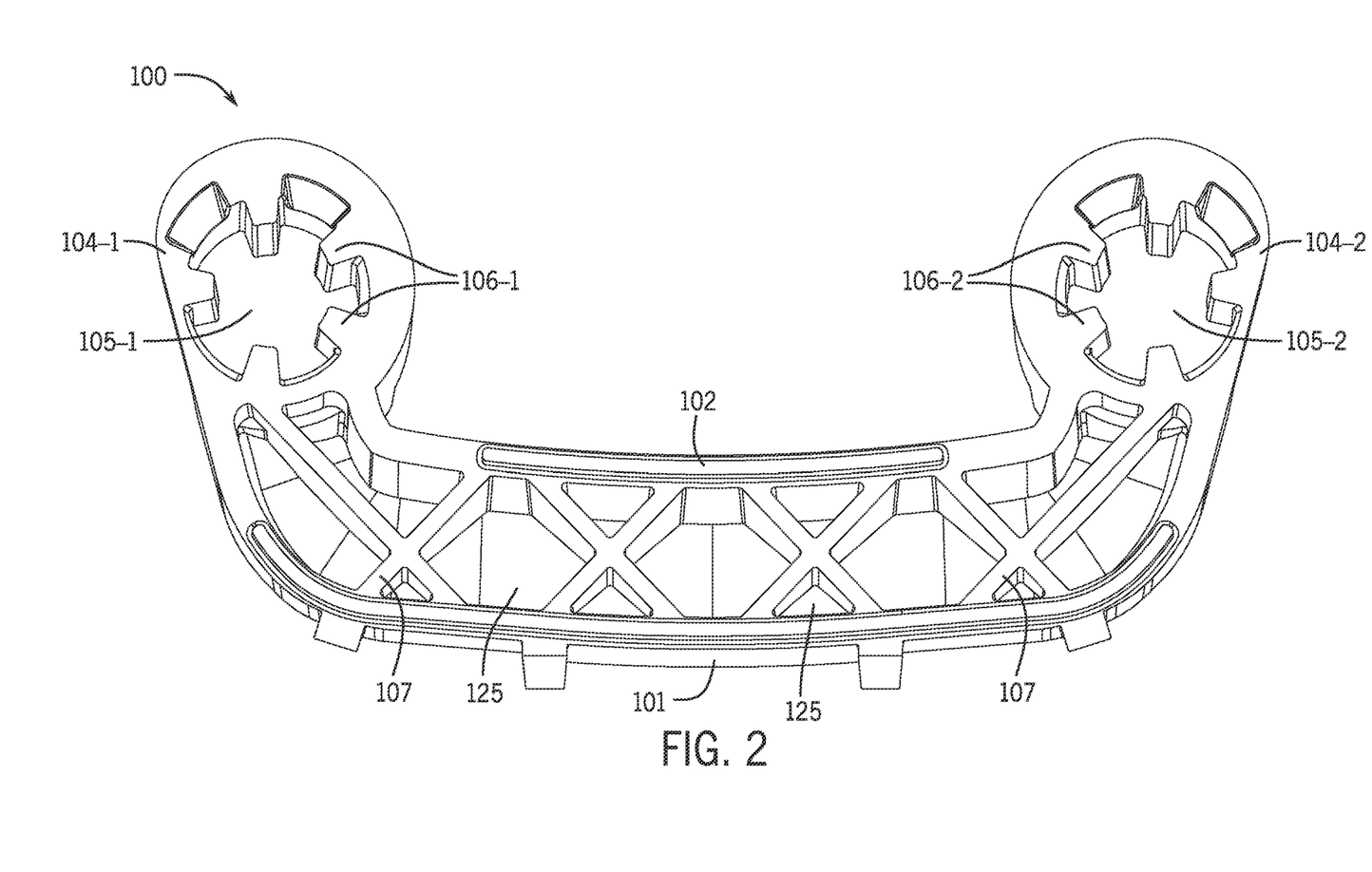
FIG. 2 is a top view of the light pipe shown in FIG. 1.

FIG. 2 is a top view of the light pipe 100. The first wall 101, second wall 102, mounting structures 104-1, 104-2, receiving bores 105-1, 105-2, and engagement tabs 106-1, 106-2 are visible in FIG. 2.

The light pipe 100 also includes a plurality of hollowed zones 125 formed between the first wall 101 and the second wall 102. In the depicted embodiment, the hollowed zones 125 are interspersed between a plurality of reinforcing ribs 107, which structurally connect the first wall 101 to the second wall 102. The hollowed zones 125 enhance the ability of the light pipe 100 to perform the function of shock absorption by allowing for energy dissipation, as will be described in greater detail below.

In the depicted embodiment, the reinforcing ribs 107 are X-shaped. In an alternative embodiment, a light pipe in accordance with the present disclosure could have reinforcing ribs (or other structures) that are shaped differently. As non-limiting examples, the structure(s) that connect the first wall 101 and the second wall 102 could be circular, spiral-shaped, wavy, S-shaped, H-shaped, or the like. In some embodiments, the structure(s) that connect the first wall 101 and the second wall 102 could form a grid or mesh pattern.

In the depicted embodiment, the first wall 101, second wall 102, first mounting structure 104-1, and second mounting structure 104-2 collectively form a U shape. However, those skilled in the art will recognize that the scope of the present disclosure is not limited in this regard. In alternative embodiments, a light pipe can have a different shape. The shape of a light pipe in accordance with the present disclosure depends on the specific spatial and design requirements of the barcode-reading device with which the light pipe will be utilized. A light pipe in accordance with the present disclosure should align with the geometry of the corresponding barcode-reading device.

Figure 3:
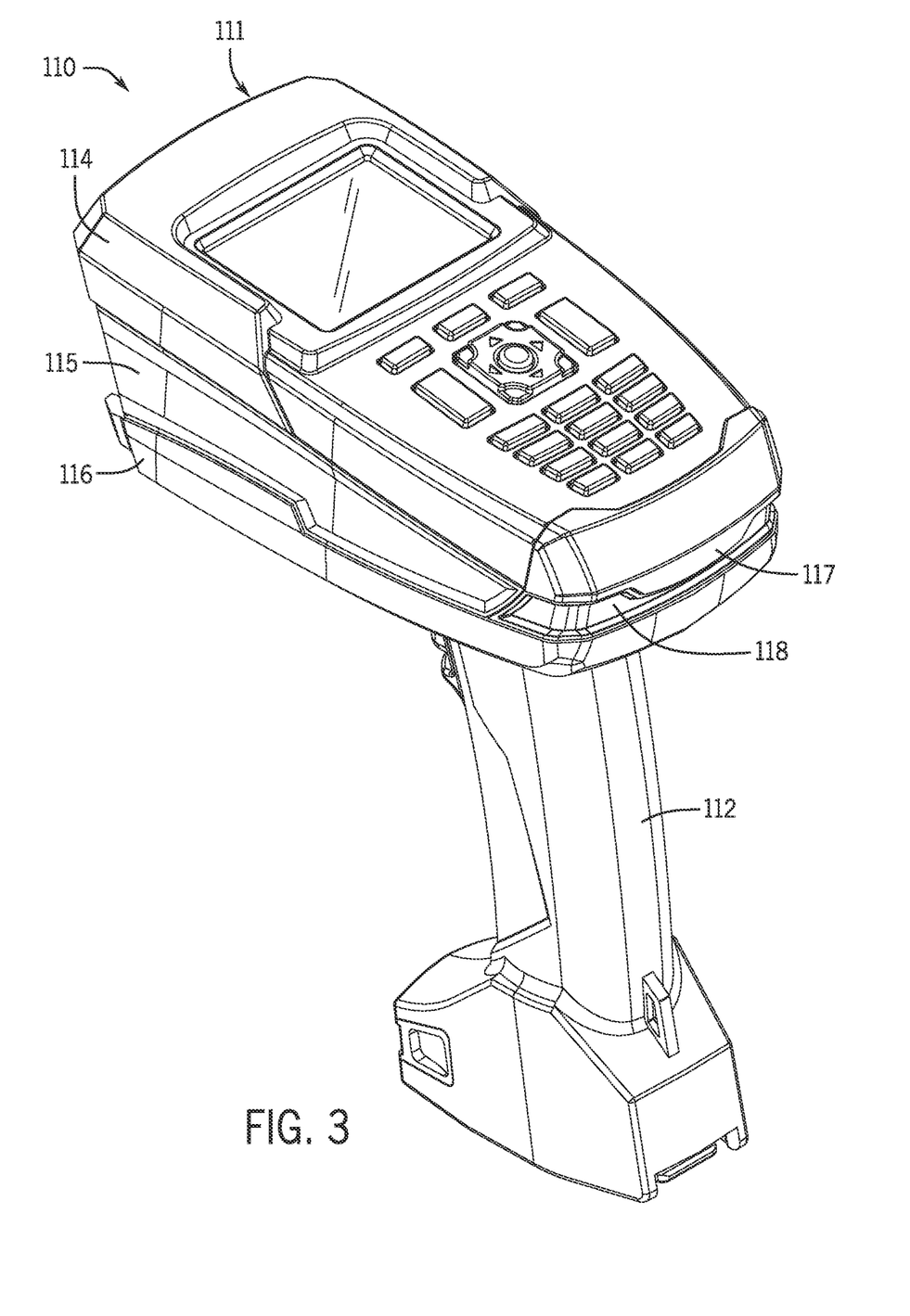
FIG. 3 is a perspective view of a barcode-reading device into which the light pipe shown in FIGS. 1 and 2 can be integrated.

FIG. 3 is a perspective view of a barcode-reading device 110 into which the light pipe 100 can be integrated. More specifically, FIG. 3 shows aspects of the housing 111 of the barcode-reading device 110. In the depicted embodiment, the barcode-reading device 110 is a "gun-type" device with a handle 112 that the user can grip during operation. This design allows the user to aim the barcode-reading device 110 at a barcode and easily scan it, making it a popular choice in retail and other environments where rapid barcode scanning is required. However, the scope of the present disclosure is not limited to the specific type of barcode-reading device 110 shown in FIG. 3. The techniques disclosed herein can be utilized in connection with other types of barcode-reading devices, such as pen-type barcode-reading devices, fixed-mount barcode-reading devices, or the like.

In the depicted embodiment, the housing 111 of the barcode-reading device 110 includes an upper portion 114, a middle portion 115, and a lower portion 116. The handle 112 is included within the lower portion 116 of the housing 111. As will be described in greater detail below, the light pipe 100 can be positioned between the lower portion 116 and the middle portion 115 of the housing 111.

As noted previously, the light pipe 100 can include shock absorption capabilities. In the depicted embodiment, the shock absorption provided by the light pipe 100 could be particularly effective in relation to an external impact force that is applied to the back side 117 of the housing 111, such as when the barcode-reading device 110 is dropped or knocked. However, the shock absorption provided by the light pipe 100 may also provide benefits in connection with impact force(s) that are applied to other part(s) of the barcode-reading device 110.

The back side 117 of the barcode-reading device 110 includes an optical element that is visible to a user of the barcode-reading device 110. More specifically, the back side 117 of the barcode-reading device 110 includes a diffuser 118. The diffuser 118 is located on an external surface of the barcode-reading device 110, and the diffuser 118 is visible to the user of the barcode-reading device 110. As will be described in greater detail below, the light-redirecting surfaces 103 on the light pipe 100 redirect light emitted from light sources within the interior portion of the barcode-reading device 110 toward the diffuser 118. In some embodiments, the diffuser 118 can be made from a translucent or semi-transparent material with a surface engineered to scatter or spread the light emitted by the light sources.

Figure 4:
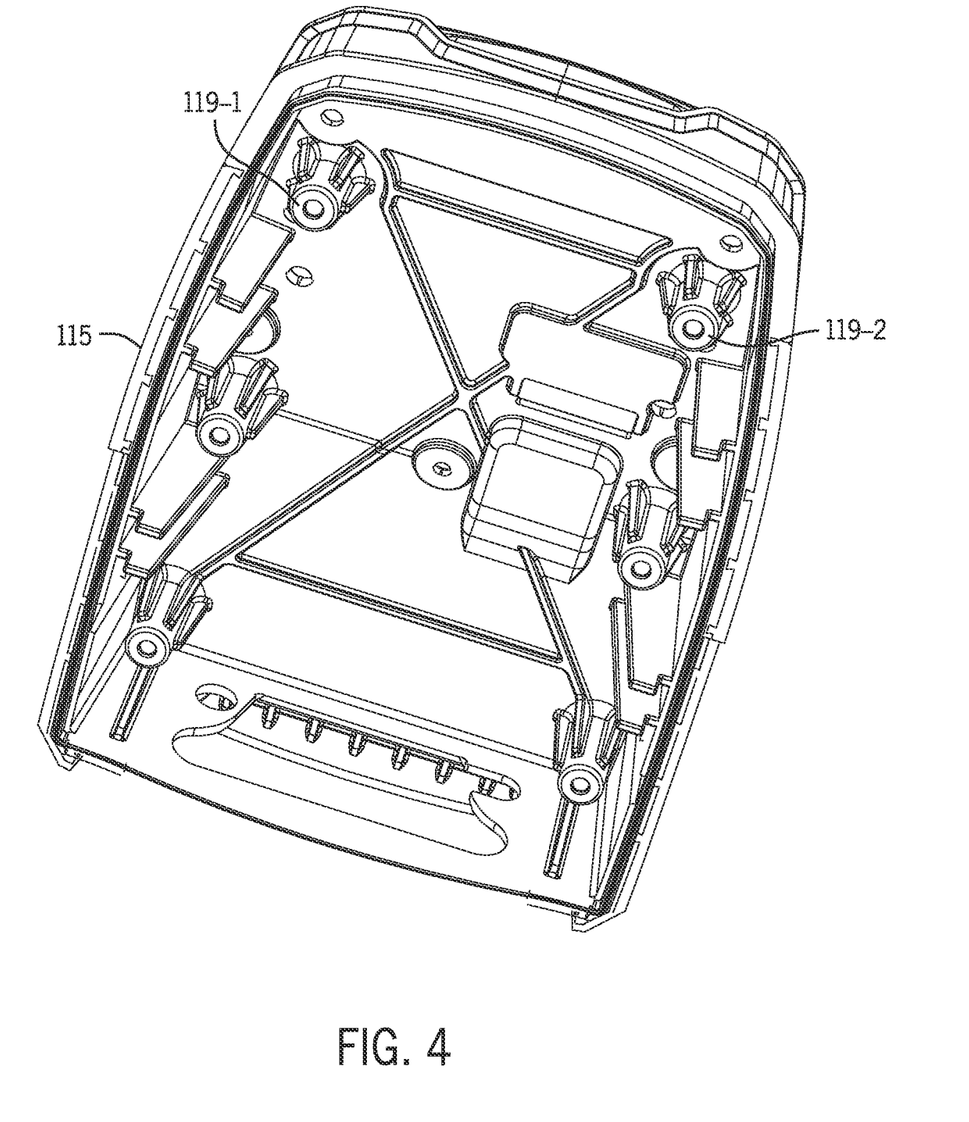
FIG. 4 is a perspective, cut-away view of the middle portion of the housing of the barcode-reading device.

FIG. 4 is a perspective, cut-away view of the middle portion 115 of the housing 111 of the barcode-reading device 110. Several bosses, including a first boss 119-1 and a second boss 119-2, protrude from the middle portion 115 of the housing 111. As described previously, the first and second mounting structures 104-1, 104-2 include first and second receiving bores 105-1, 105-2, respectively. When the light pipe 100 is positioned within the interior portion of the barcode-reading device 110, the first receiving bore 105-1 receives the first boss 119-1 and the second receiving bore 105-2 receives the second boss 119-2. The engagement tabs 106-1, 106-2 apply radial pressure against the bosses 119-1, 119-2 in order to secure the light pipe 100 to the barcode-reading device 110.

Figure 5:
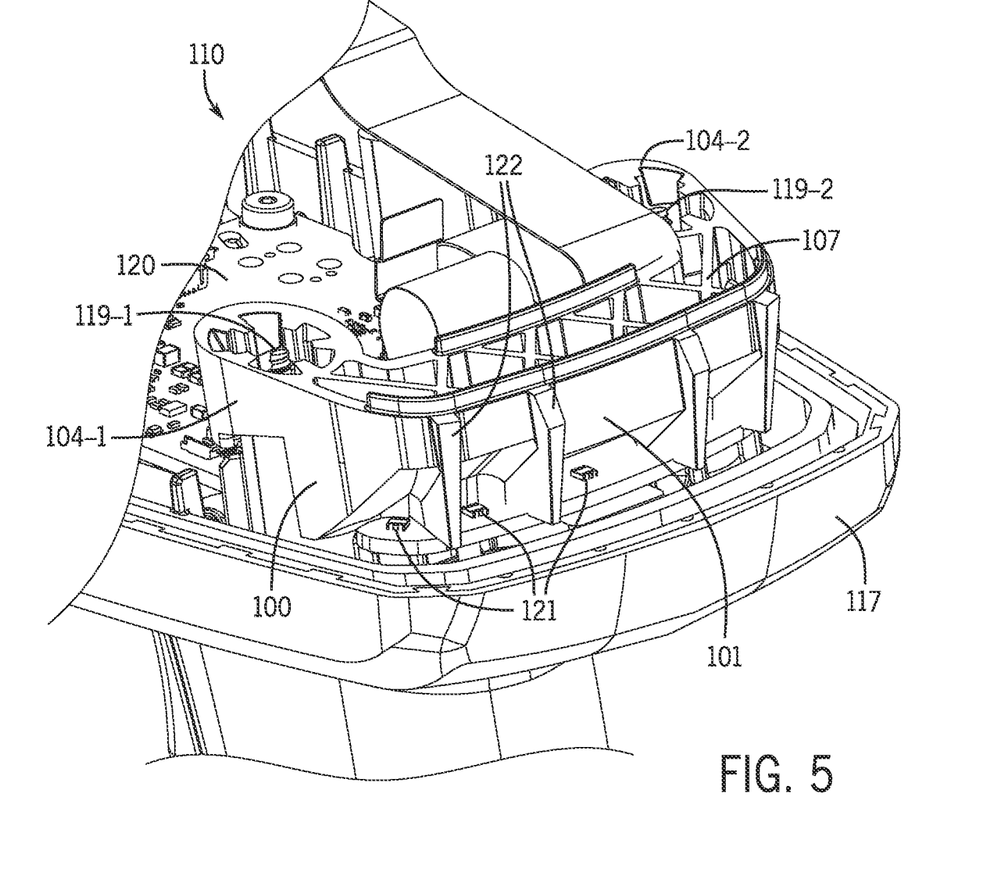
FIG. 5 is a perspective, cut-away view of the barcode-reading device, with the upper portion of the housing removed.

FIG. 5 is a perspective, cut-away view of the barcode-reading device 110, with the upper portion 114 of the housing 111 removed. The light pipe 100 has been integrated into the interior portion of the barcode-reading device 110, between the lower portion 116 and the middle portion 115 of the housing 111.

The first boss 119-1 protrudes through the first receiving bore 105-1 within the first mounting structure 104-1, and the second boss 119-2 protrudes through the second receiving bore 105-2 within the second mounting structure 104-2.

The barcode-reading device 110 includes a printed circuit board assembly (PCBA) 120. The PCBA 120 includes a plurality of light sources. In the depicted embodiment, the light sources are light-emitting diodes (LEDs) 121. The light-redirecting surfaces 103 within the light pipe 100 perform the function of redirecting light emitted from the LEDs 121 toward the diffuser 118 on the back side 117 of the housing 111 of the barcode-reading device 110. When all of the LEDs 121 are activated (e.g., in response to successfully scanning and decoding a barcode), the LEDs 121 and the light-redirecting surfaces 103 collectively produce a uniform light output at the diffuser 118.

As noted above, in addition to being able to produce a uniform light output at the diffuser 118, the light pipe 100 can also provide a segmented light output. The light pipe 100 includes a plurality of optical barriers 122 interspersed among the plurality of light-redirecting surfaces 103. The optical barriers 122 enable the light pipe 100 to provide the segmented light output by isolating light from individual LEDs 121. In other words, the optical barriers 122 separate and guide the light emitted by the various LEDs 121, ensuring that the light emitted by each LED 121 is distinctly channeled toward the diffuser 118 and does not mix with the light from the neighboring LEDs 121. Without these optical barriers 122, the light from different LEDs 121 could blend together, making it challenging to discern the specific number of lit LEDs 121. By creating a defined pathway for the light and preventing intermingling, these optical barriers 122 allow for a clear and accurate visual representation of which LEDs 121 are activated and which LEDs 121 are not activated.

In the depicted embodiment, the barcode-reading device 110 is configured so that the LEDs 121 perform at least two functions. First, the LEDs 121 are activated when the barcode-reading device 110 successfully decodes a barcode. Second, the LEDs 121 indicate the current charge level in a rechargeable battery within the barcode-reading device 110. The number of activated LEDs 121 is proportional to the current charge level of the rechargeable battery, with more LEDs 121 lighting up as the current charge level increases.

The specific functions performed by the LEDs 121 are provided for purposes of example and should not be interpreted as limiting the scope of the present disclosure. A light pipe in accordance with the present disclosure can be used to redirect light from light sources that perform only one of the aforementioned functions, or that perform different function(s) altogether.

The light pipe 100 is also designed to absorb and dissipate energy that might otherwise be transmitted to the PCBA 120 and damage the electronic components on the PCBA 120. As noted above, the light pipe 100 can be made from a material that is both flexible and resilient. The hollowed zones 125, in conjunction with the flexible and resilient material, enable the light pipe 100 to perform shock absorption (including energy dissipation). More specifically, in the event of physical shocks or impacts, such as when the barcode-reading device 110 is dropped or knocked, the hollowed zones 125 allow the adjacent material to flex (due to the flexible and resilient nature of the material from which the light pipe 100 is made) in order to dissipate energy from the external impact and thereby contribute to the shock absorption provided by the light pipe 100. The shock absorbing capability of the light pipe 100 can reduce the risk of mechanical damage, cracking, or misalignment of the sensitive components, connections, and solder joints on the PCBA 120. By maintaining the integrity of these elements, the light pipe 100 can increase the likelihood that the barcode-reading device 110 will continue to function correctly and efficiently, even after being subjected to physical stress.

Figure 6:
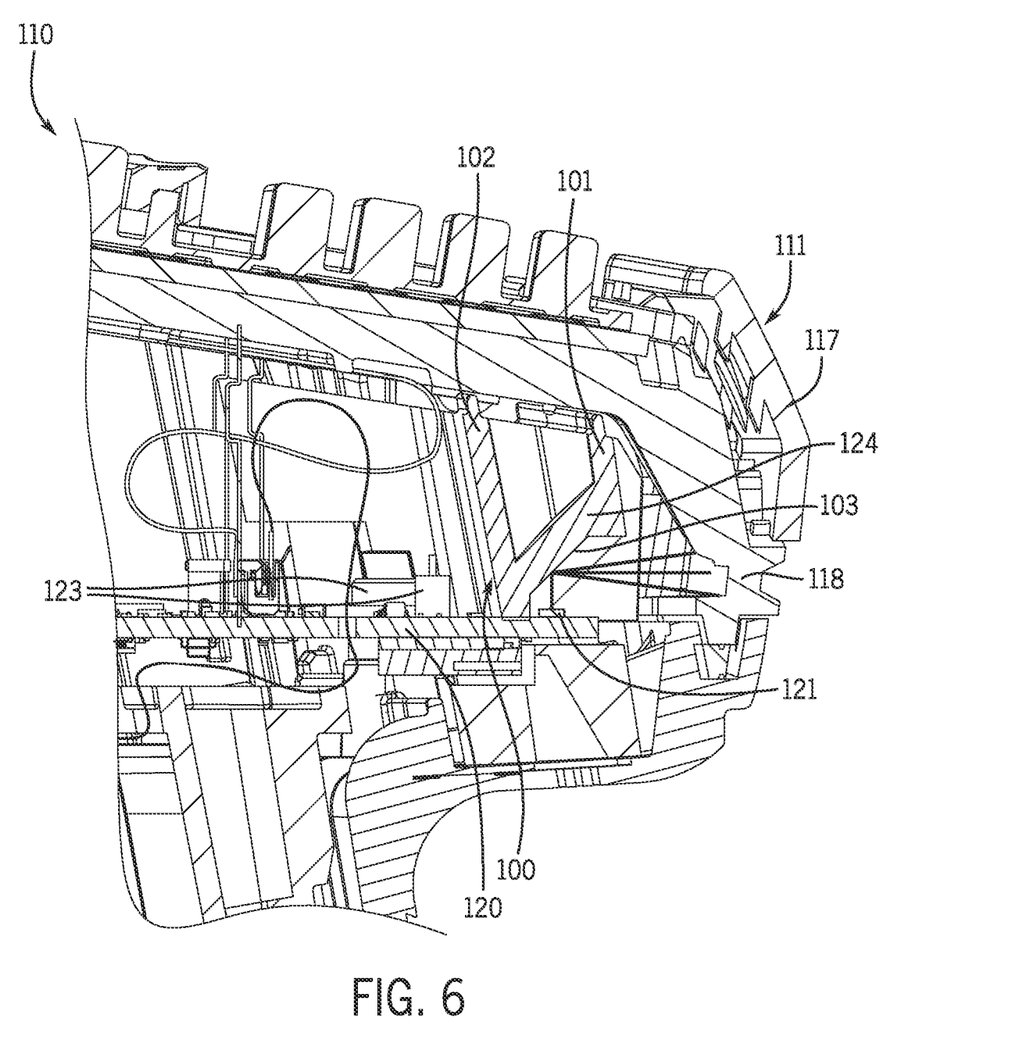
FIG. 6 is a side cross-sectional view of the barcode-reading device.

FIG. 6 is a side cross-sectional view of the barcode-reading device 110. The PCBA 120, the LEDs 121, and the light pipe 100 are visible in FIG. 6.

FIG. 6 illustrates how the light-redirecting surfaces 103 on the light pipe 100 redirect light emitted by the LEDs 121 toward the diffuser 118 on the back side 117 of the housing 111. Each LED 121 emits light in a direction that does not intersect with the diffuser 118, and the light pipe 100 is positioned so that the light-redirecting surfaces 103 redirect the light toward the diffuser 118. More specifically, in the depicted embodiment each LED 121 emits light in a substantially vertical direction, and the light-redirecting surfaces 103 redirect the light in a substantially horizontal direction toward the diffuser 118.

FIG. 6 shows light being redirected from a single LED 121. However, as previously discussed, the light pipe 100 has a plurality of light-redirecting surfaces 103 (as shown in FIG. 1) and the PCBA 120 includes a plurality of LEDs 121 (as shown in FIG. 5). The light pipe 100 is positioned so that each LED 121 on the PCBA 120 is located underneath a light-redirecting surface 103 of the light pipe 100. The light-redirecting surfaces 103 collectively redirect light from the plurality of LEDs 121 toward the diffuser 118. When all of the LEDs 121 are activated, the result is a uniform light output. When only some of the LEDs 121 are activated, the result is a segmented light output.

Advantageously, the light pipe 100 is a single structure that is manufactured through a single tooling process. Thus, in accordance with the present disclosure, a single structure can be used to produce a plurality of different types of light outputs (e.g., uniform and segmented). In contrast, with conventional approaches, a plurality of different light pipes would be needed to produce a plurality of different types of light outputs.

In some embodiments, the light-redirecting surfaces 103 on the light pipe 100 are polished. In this context, the term "polished" refers to the process of finishing the light-redirecting surfaces 103 to a high degree of smoothness. This is usually done to minimize the scattering of light and allow the light to be redirected more precisely. When a surface is polished, imperfections, scratches, or any irregularities are removed or reduced, resulting in a surface that is very smooth and reflective. The more finely polished the surface, the more controlled and effective the light redirection will be.

In some embodiments, the light pipe 100 can have an opaque white color. In other words, the light pipe 100 can be made from a material that is impenetrable (or substantially impenetrable) to light and reflects all (or substantially all) of the light emitted by the LEDs 121, rather than being absorbed or transmitted through the light pipe 100. This ensures that the light does not pass through the light pipe 100 but is instead reflected off the light-redirecting surfaces 103. However, those skilled in the art will recognize that the scope of the present disclosure is not limited in this regard. In alternative embodiments, a light pipe can have a different color.

As can be seen in FIGS. 5 and 6 collectively, the light pipe 100 is positioned such that the second wall 102 is in contact with the PCBA 120 but the first wall 101 is not in contact with the PCBA 120. Each light-redirecting surface 103 is located on a connecting wall 124 that connects the first wall 101 and the second wall 102. In the depicted embodiment, each connecting wall 124 is oriented at an angle of about 45° relative to the PCBA 120. In an alternative embodiment, each connecting wall 124 could be oriented at a different angle relative to the PCBA 120. In some embodiments, each connecting wall 124 can be oriented at an angle between about 40° and about 50° relative to the PCBA 120. In general, a connecting wall could be oriented at an angle greater than 0° and less than 90° relative to the PCBA 120.

FIG. 6 also illustrates how the light pipe 100 provides shock absorption in order to protect electronic components 123 on the PCBA 120. Both the first wall 101 and the second wall 102 of the light pipe 100 are positioned between the back side 117 of the housing 111 of the barcode-reading device 110 and various electronic components 123 on the PCBA 120. The first wall 101 is positioned closer to the back side 117 of the housing 111 than the second wall 102. Therefore, an external impact force to the back side 117 of the housing 111 affects the first wall 101 before it affects the second wall 102. The hollowed zones 125 allow the adjacent material (i.e., the reinforcing ribs 107) to flex, thereby dissipating energy from the impact force before it reaches the second wall 102. This minimizes potential damage to the electronic components 123 on the PCBA 120.

As noted above, in some embodiments the light pipe 100 can be made from a material that is both flexible and resilient. In such embodiments, because the light pipe 100 is made from a material that is flexible, absorbing an impact force to the back side 117 of the housing 111 causes the first wall 101 and at least some of the reinforcing ribs 107 to become temporarily deformed. However, because the light pipe 100 is made from a material that is resilient, the first wall 101 and any of the reinforcing ribs 107 that become temporarily deformed after absorbing the impact force return to their original shape relatively quickly.

The hardness of the material from which the light pipe 100 is made can be measured in terms of the Shore A scale. The Shore A scale is a metric that indicates the hardness of elastomeric and soft plastic materials, such as rubber, neoprene, and polyurethane. The Shore A scale ranges from 0 to 100, where a higher value indicates a harder material. In some embodiments, the light pipe 100 is made from a material having a hardness of about 30 on the Shore A scale. In some embodiments, the light pipe 100 is made from a material having a hardness between about 20 and about 50 on the Shore A scale.

As noted above, uniform and segmented light outputs can be utilized in a variety of different scenarios. Some non-limiting examples of scenarios in which these different types of light output could be useful will now be described.

As non-limiting examples, a uniform light output could be useful to indicate that: (i) a barcode has been successfully scanned and decoded; (ii) a barcode-reading device has successfully been paired or connected with another device; (iii) data transfer is in progress with another device; (iv) a firmware update is currently being downloaded to or installed on a barcode-reading device; (v) a barcode-reading device is in a specific mode of operation, such as standby or sleep mode; and/or (vi) an error condition, such as a misread or the need for a user to adjust the position of the barcode-reading device. Those skilled in the art will recognize additional scenarios in which a uniform light output can be utilized.

As non-limiting examples, a segmented light output could be useful to indicate: (i) the current charge level of a rechargeable battery within a barcode-reading device; (ii) the memory and/or storage capacity of a barcode-reading device; and/or (iii) the strength of a wireless network signal. Those skilled in the art will recognize additional scenarios in which a segmented light output can be utilized.

In some embodiments, a light pipe as disclosed herein can be implemented in a Direct Part Marking (DPM) barcode-reading device. A DPM barcode-reading device is a specialized device engineered to read barcodes that are etched, dot-peened, or otherwise marked directly onto the surface of materials, often on durable goods such as metals or hard plastics. These direct markings are especially useful in industrial environments where traditional label-based barcodes may not withstand the rigors of manufacturing, handling, or usage. In the context of the present disclosure, alternative embodiments of the light pipe are contemplated, allowing for integration within a DPM barcode reader. The component's dual functionality of shock absorption and light redirection would lend itself to enhance the operational reliability and efficiency of a DPM barcode-reading device, where the unique challenges of reading directly marked codes necessitate precise alignment and robust performance.

The terms "comprising," "including," and "having" are intended to be inclusive and mean that there can be additional elements other than the listed elements.

In the context of mechanical structures, the term "coupled" denotes the connection or linkage between two or more components, parts, or elements of a mechanical structure. This connection or linkage can either be direct or indirect. A direct coupling implies that the elements are physically joined, attached, or integrally formed as a singular unit within the structure, without the necessity for separate intermediate components. In contrast, an indirect coupling may involve other elements or mediums facilitating the linkage between parts. Various means, such as mechanical fasteners, adhesives, welding, friction fitting, or magnetic interaction, can achieve this coupling. It can either permit relative motions like rotational or translational movement or be rigid, inhibiting any relative motion between the joined components. Whether temporary or permanent, this coupling can be purposed to convey force, motion, energy, or signals among the interconnected components. The term "coupled" as defined here aims to encapsulate all such associations or linkages, regardless of the specific method or mechanism of coupling.

The term "about" refers to a degree of deviation from a numerical value or range, which is considered acceptable in achieving the desired objective. In some embodiments, this deviation can include a variation of ±0.1% of the specified value or range. In other embodiments, this deviation can include a variation of ±1% of the specified value or range. In further embodiments, this deviation can include a variation of ±5% of the specified value or range. Moreover, those skilled in the art will recognize that the percentage of deviation could vary from the specific percentages just listed while still remaining within the scope of the present disclosure.

The term "substantially" should be interpreted to mean "to a great extent or degree." The term "substantially" denotes that something is mostly or for the most part as specified but may not be in all details or aspects. In other words, the term "substantially" means that the exact description may not be met, but the variation from the description does not materially affect the basic functionality of that element or component. This allows for tolerances, variations, and imperfections that do not materially affect performance.

The term "substantially horizontal" means that something is mostly or significantly horizontal, although it may not be perfectly so. In some embodiments, something is "substantially horizontal" if its deviation from perfect horizontality is less than or equal to 0.1 degrees. In other embodiments, something is "substantially horizontal" if its deviation from perfect horizontality is less than or equal to 1 degree. In other embodiments, something is "substantially horizontal" if its deviation from perfect horizontality is less than or equal to 5 degrees. Moreover, those skilled in the art will recognize that the amount of deviation could vary from the specific values just listed while still remaining within the scope of the present disclosure.

The term "substantially vertical" means that something is mostly or significantly vertical, although it may not be perfectly so. In some embodiments, something is "substantially vertical" if its deviation from perfect verticality is less than or equal to 0.1 degrees. In other embodiments, something is "substantially vertical" if its deviation from perfect verticality is less than or equal to 1 degree. In other embodiments, something is "substantially vertical" if its deviation from perfect verticality is less than or equal to 5 degrees. Moreover, those skilled in the art will recognize that the amount of deviation could vary from the specific values just listed while still remaining within the scope of the present disclosure.

References to "one embodiment" or "an embodiment" of the present disclosure are not intended to be interpreted as excluding the existence of additional embodiments that also incorporate the recited features. For example, any element or

What is claimed is:

1. A light pipe for integration within an interior portion of a barcode-reading device having a plurality of light sources, the light pipe comprising:
   a plurality of light-redirecting surfaces that are each positioned to receive light from a respective light source within the interior portion of the barcode-reading device and to redirect the light toward an optical element positioned on an exterior surface of the barcode-reading device, wherein the plurality of light sources and the plurality of light-redirecting surfaces collectively produce a uniform light output at the optical element when all of the plurality of light sources are activated; and
   a plurality of optical barriers interspersed among the plurality of light-redirecting surfaces to isolate light from individual light sources, thereby allowing for a segmented light output distinct from the uniform light output to be projected onto the optical element.

2. The light pipe of claim 1, wherein the light pipe is a single structure that is manufactured through a single tooling process.

3. The light pipe of claim 1, wherein:
   the uniform light output is characterized by a homogenized light pattern without discernible gaps or variances in brightness; and
   the segmented light output comprises separated and distinct light patterns, each corresponding to an individual light source within the barcode-reading device.

4. The light pipe of claim 1, wherein the plurality of light sources are activated when the barcode-reading device successfully scans and decodes a barcode.

5. The light pipe of claim 1, wherein:
   the plurality of light sources indicate a current charge level in a rechargeable battery within the barcode-reading device; and
   the number of activated light sources on the barcode-reading device is proportional to the current charge level of the barcode-reading device, with more light sources being activated as the current charge level increases.

6. A light pipe for integration within an interior portion of a barcode-reading device having one or more light sources, the light pipe being configured to redirect light emitted by the one or more light sources, the light pipe being made from a material having flexibility and resiliency so that the light pipe can also facilitate shock absorption, the light pipe comprising:
   one or more light-redirecting surfaces that are positioned to receive light from a light source within the interior portion of the barcode-reading device and to redirect the light toward an optical element positioned on an exterior surface of the barcode-reading device;
   a first wall;
   a second wall opposing the first wall; and
   a plurality of hollowed zones formed between the first wall and the second wall, wherein the plurality of hollowed zones, in conjunction with the flexibility and the resiliency of adjacent material, allow the adjacent material to flex in order to dissipate energy from an external impact to the barcode-reading device, thereby contributing to the shock absorption provided by the light pipe.

7. The light pipe of claim 6, wherein the interior portion of the barcode-reading device comprises a plurality of light sources, and wherein the light pipe is configured to:
   provide a uniform light output at the optical element when all of the plurality of light sources are activated; and
   provide a segmented light output at the optical element when only some of the plurality of light sources are activated.

8. The light pipe of claim 7, further comprising a plurality of optical barriers integrated within the first wall, the plurality of optical barriers being designed to separate and guide light from individual light sources, thereby enabling the segmented light output to be provided at the optical element.

9. The light pipe of claim 6, wherein:
   the barcode-reading device comprises a printed circuit board assembly (PCBA);
   the PCBA comprises the one or more light sources; and
   the light pipe is positioned such that the second wall is in contact with the PCBA, the first wall is not in contact with the PCBA, and each light source among the one or more light sources is located underneath a light-redirecting surface of the light pipe.

10. The light pipe of claim 9, wherein:
    the one or more light-redirecting surfaces are located on a connecting wall that connects the first wall and the second wall; and
    the connecting wall is oriented at an angle greater than zero degrees and less than ninety degrees relative to the PCBA.

11. The light pipe of claim 6, wherein the one or more light sources are activated when the barcode-reading device successfully decodes a barcode.

12. The light pipe of claim 6, wherein:
    the barcode-reading device comprises a plurality of light sources;
    the plurality of light sources indicate a current charge level in a rechargeable battery within the barcode-reading device; and
    the number of activated light sources on the barcode-reading device is proportional to the current charge level of the barcode-reading device, with more light sources being activated as the current charge level increases.

13. The light pipe of claim 6, wherein the one or more light-redirecting surfaces are polished.

14. The light pipe of claim 6, wherein:
    the light pipe comprises a plurality of reinforcing ribs that structurally connect the first wall to the second wall; and
    the plurality of hollowed zones are interspersed between the plurality of reinforcing ribs.

15. The light pipe of claim 14, wherein:
the second wall is designed to be positioned between a housing of the barcode-reading device and at least one electronic component within the barcode-reading device;
the first wall is designed to be positioned (i) between the housing and the at least one electronic component, and (ii) closer to the housing than the second wall such that an impact force to an adjacent portion of the housing affects the first wall before it affects the second wall; and
the plurality of hollowed zones allow the plurality of reinforcing ribs to flex so that energy from the impact force is dissipated before reaching the second wall, thereby minimizing potential damage to the at least one electronic component.

16. The light pipe of claim 14, wherein because of the flexibility and the resiliency of the material from which the light pipe is made:
absorbing the impact force causes the first wall and at least some of the plurality of reinforcing ribs to become temporarily deformed; and
the first wall and any of the plurality of reinforcing ribs that become temporarily deformed after absorbing the impact force subsequently return to their original shape.

17. The light pipe of claim 6, wherein the material from which the light pipe is made has a hardness between about 20 and about 50 on the Shore A scale.

18. The light pipe of claim 6, wherein:
the light pipe comprises a first mounting structure coupled to the first wall and the second wall at a first end of the light pipe;
the light pipe additionally comprises a second mounting structure coupled to the first wall and the second wall at a second end of the light pipe; and
the first mounting structure and the second mounting structure each comprise a receiving bore designed to receive a boss that protrudes from the housing of the barcode-reading device.

19. The light pipe of claim 18, wherein the first mounting structure and the second mounting structure each additionally comprise a plurality of engagement tabs that are radially disposed around the receiving bore and that apply radial pressure against the boss when inserted.

20. A barcode-reading device, comprising:
a housing comprising an optical element located on an external surface of the housing;
a printed circuit board assembly (PCBA) comprising one or more electronic components and one or more light sources; and
a light pipe being made from a material having flexibility and resiliency in order to facilitate shock absorption, the light pipe comprising:
one or more light-redirecting surfaces that are positioned to receive light from a light source within an interior portion of the barcode-reading device and to redirect the light toward the optical element;
a first wall;
a second wall opposing the first wall; and
a plurality of hollowed zones formed between the first wall and the second wall, wherein the plurality of hollowed zones, in conjunction with the flexibility and the resiliency of adjacent material, allow the adjacent material to flex in order to dissipate energy from an external impact to the barcode-reading device, thereby contributing to the shock absorption provided by the light pipe.

\* \* \* \* \*